Figure 4:
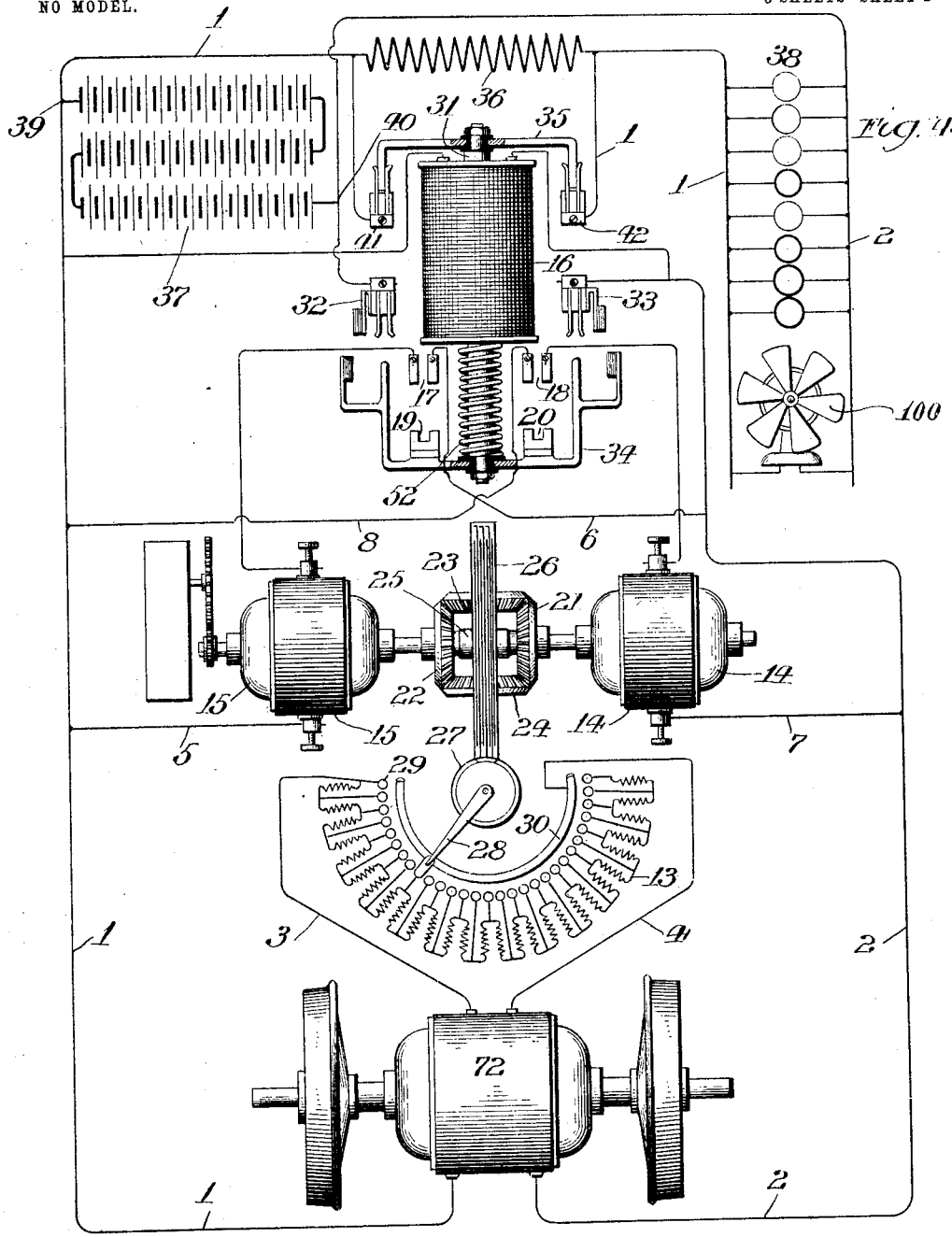

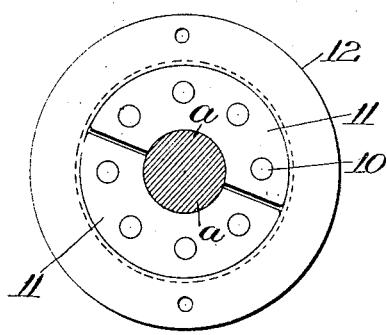
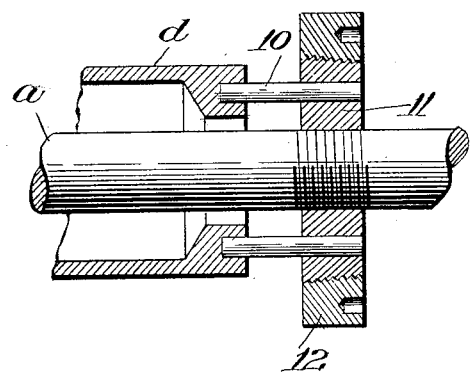
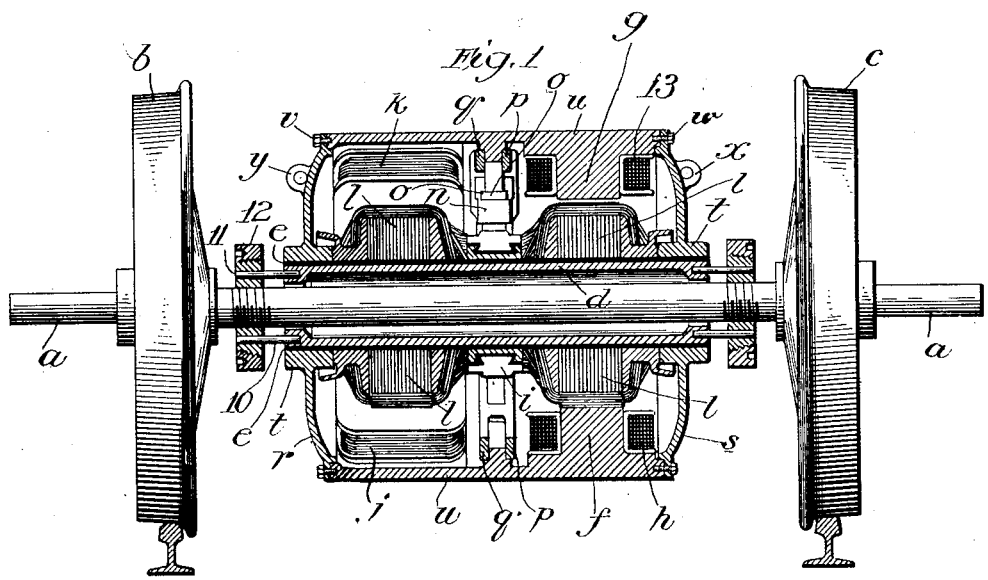

No. 752,839. PATENTED FEB. 23, 1904.
D. C. HENRY.
SYSTEM OF ELECTRIC TRAIN LIGHTING.
APPLICATION FILED SEPT. 23, 1901.
NO MODEL. 3 SHEETS—SHEET 2.

Witnesses:
Harold G. Barrett
Lute S. Alter

Inventor:
David Carl Henry
By Thomas F. Sheridan,
Atty's

No. 752,839. PATENTED FEB. 23, 1904.
D. C. HENRY.
SYSTEM OF ELECTRIC TRAIN LIGHTING.
APPLICATION FILED SEPT. 23, 1901.
NO MODEL. 3 SHEETS—SHEET 3.

Witnesses:
Inventor:
David Carl Henry,
By Thomas F. Sheridan,
Att'y

No. 752,839. Patented February 23, 1904.

UNITED STATES PATENT OFFICE.

DAVID CARL HENRY, OF DENVER, COLORADO, ASSIGNOR TO HENRY ELECTRIC EQUIPMENT COMPANY, OF DENVER, COLORADO.

SYSTEM OF ELECTRIC TRAIN-LIGHTING.

SPECIFICATION forming part of Letters Patent No. 752,839, dated February 23, 1904.

Application filed September 23, 1901. Serial No. 76,200. (No model.)

*To all whom it may concern:*

Be it known that I, DAVID CARL HENRY, a citizen of the United States, residing at Denver, in the county of Arapahoe and State of Colorado, have invented certain new and useful Improvements in Systems of Electric Train-Lighting, of which the following is a specification.

This invention relates to new and useful devices which I have employed to meet the various difficulties which arise in the endeavor to light railroad-cars by means of electricity generated from the momentum of the train. It should be understood, however, that this application may be used wherever it is necessary to secure a current of constant voltage in the same direction from a varying and reversible source of potential.

My invention dispenses with a number of serious difficulties in this class of devices which have tended to retard the progress of electric train-lighting from the first, among them being the belt-driven dynamo, with its loss of power caused by the slipping of the belt, its tendency to run hot, owing to the great speed necessary to produce the desired current, and the ever-present danger of the belt breaking and slipping off the pulleys. It is also practically impossible to prevent the dust and gravel which is raised by the train from gathering on the surface of the belt, where it soon cuts into its fiber, necessitating renewal of the belt and expert attention.

Instead of the belt or gear driven generator I employ a direct-connected generator of special design and with numerous improvements. In my form of generator we have little wear on the brushes or commutator, due to their slow speed and large size, thus obviating the necessity of constant and expert attention, which is costly and not at all times obtainable. In a large direct-connected generator lubrication is of minor importance, while in the case of the rapidly-revolving belt machine it is one of the most serious problems.

One of the forms of generator employed consists of a twin or double generator having two sets of field-energizing magnets and two armatures; but a common commutator and set of collecting-brushes is employed for both. By this construction I am enabled to obtain with a limited diameter of armature a great current output. The armature is wound on a bushing, which latter serves as bearings for the field-frame. The web extending from these bearings to the main body of the field may be imperforated, and thereby serve also as a dust-proof casing. The armature may be completed in the factory, and the bushing on which it is mounted has an opening larger than the car-axle. After one of the car-wheels is forced on the axle the complete armature is slipped over the free end of said axle, after which the second wheel is hydraulically mounted on the same.

To overcome detrimental vibration of the generator due to irregularity of the track, I apply a special spring-support at each end of the armature-bushing. The springs are powerful and ample to stand the weight of the generator under all conditions. On the other hand, they furnish a yielding support for the same in radial or vertical direction and produce a cushioning effect instead of a hammer-blow whenever the wheels pass over some irregular or uneven points on the track.

To prevent the field from turning, eyebolts are attached to the frame and anchored to the bottom of the car-body by means of chains. Between two sections of a chain I place a powerful spring to take up any sudden jerk. The two sets of pole-pieces may be placed in staggered position, each acting on an armature core and winding. The commutator is located centrally between the two armature cores and windings, while the brushes and brush-holder are similarly located between the two sets of field-poles.

Owing to the fact that the direction of car travel changes means must be provided to cause the current in the external circuit to travel in the same direction in spite of the reversal of such car travel. I accomplish this by allowing the brushes and brush-holder to be movable between two successive points of commutation. When the car moves ahead, the brushes are in the proper place for collecting the current without sparking, and the brush-holder rests against one stop. If the car stops and is run in the opposite direction, the friction with the commutator moves the brushes away from the position just mentioned and also the brush-holder, which assumes a different circumferential position with relation to the commutator and armature conductors. A stop applied to the holder causes the brushes to advance no farther than the next point of commutation. By this simple means of reversing the brushes when the armature rotation is reversed I insure the current-flow in the same direction for the external circuit.

In order to maintain constant voltage at the generator-terminals regardless of the train speed, I apply a resistance in the shunt-fields of my generator, which is automatically inserted or excluded by a regulator when a certain maximum or minimum terminal voltage is reached. The regulator consists in part of a motor whose speed varies with increasing or decreasing voltage, and thereby actuates means adapted to include more or less resistance in series with the shunt-winding of the generator.

The external circuit is controlled by a solenoid-switch placed across the line. It connects the current to a storage battery, from which the lamps derive their current-supply when the car is not in motion or when the car speed is below a certain normal. The battery as well as the translating devices may be supplied simultaneously from the generator, while the correct potential required for each circuit is adjusted by a suitably-interposed resistance.

In the accompanying drawings, Figure 1 is a view of the generator mounted on the axle of the train, showing the improvements in its structure that I have mentioned; Fig. 2, an end view of the method that I have adopted to cushion the generator from the vibrations of the car-axle; Fig. 3, a side view of the mechanism shown in Fig. 2; Fig. 4, a diagram of the system, showing wiring, batteries, switch, translating-circuit, and regulating devices; and Fig. 5, a sectional elevation taken through the transverse center of Fig. 1 looking toward the right.

Figure 5:
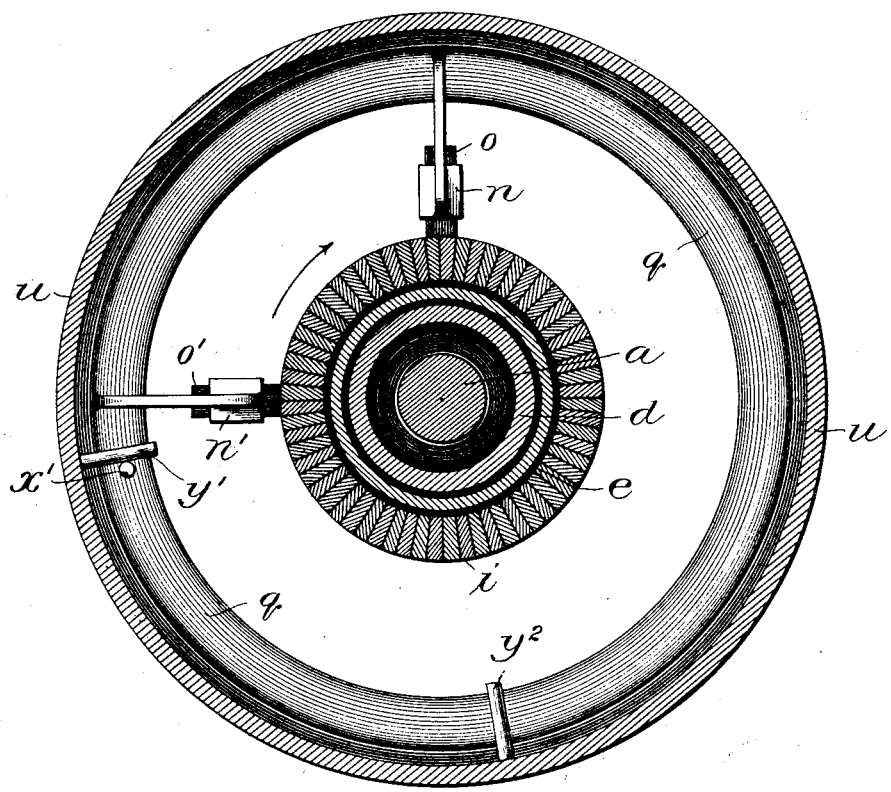

In the drawing Fig. 1 I have shown direct-connected generator with its axle $a$, being the axle of the car-truck. $b$ and $c$ are the wheels of the car-truck, and $d$ the bushing, on which the generator is mounted. $e$ is a tubing of insulating and compressible material placed for the dual purpose of insulating the generator's armature from the axle and also as a cushion to take up all vibration. On the right side of the commutator I have shown a section of the fields $f$ and $g$, with $h$ as a cross-section of the wire wound around them. The two field-pieces lying in a horizontal plane are invisible in this sectional view. On the left side of the commutator $i$ I have another four-pole structure, of which the poles $j$ and $k$ are shown, the other two not being shown. These poles are staggered with the four poles on the opposite side. $l$ represents the two armatures of the generator, wires being led from them to the commutator $i$, which in practice may have twice the number of segments as there are slots in a single armature or any equal number of segments as there are slots in the two. $n$ represents a brush-holder, of which $o$ is an arm extending therefrom, which is fastened to the two circular rings $p$ and $q$, which run in guides in the outer frame of the generator and are stopped at predetermined positions in order to allow the brushes certain freedom of movement over the surface of the commutator. $r$ and $s$ are the two end pieces of the armature-cover and field-support and are journaled on the bushing $d$ and $t$. $u$ is the outer barrel-shaped yoke of the generator, connecting, respectively, the sets of poles $f$ and $g$ with one another and $j$ and $k$, joining them centrally. The yoke is fastened with bolts, such as $v$ and $w$, to two end pieces $r$ and $s$. $x$ and $y$ are the two eyebolts through which the chains pass, which are fastened to the bottom of the car, holding the field-frame of the generator from turning. The brush-holder ring runs in grooves in the outer shell of the generator, as shown in longitudinal cross-section, Fig. 1. Attached to this ring is a plurality of brushes, as shown in Fig. 5, $n$ and $n'$ being the brush-holders, and $o$ and $o'$ the brushes, which press firmly on the commutator $i$, Fig. 5. It is evident, then, that this ring $p$ is free to revolve within certain limits, these limits being the two projections from the generator $y$ and $y^2$, Fig. 5, which engage the pin $x'$, mounted on the ring $p$, and prevents the pin on the ring $x'$ from turning past $y$ and $y^2$. It is evident, then, that if the ring $p$, Fig. 5, be free to revolve in certain limits—say from $y'$ to $y^2$, Fig. 5—the brushes will also be free to revolve according to the direction of rotation of the commutator within the portion of arc limited by pins $y'$ and $y^2$, provided, of course, that sufficient pressure is maintained on the commutator $i$, Fig. 5, by the brushes $o$ and $o'$ to overcome the friction of the ring $p$ in the grooves of the shell of the generator. Without going into details it is evident that if these brushes are allowed to change their relative positions with the reversal of the direction of rotation of the generator a current of constant potential will always be taken from the same brush-holder, and therefore no matter what the direction of rotation of certain members of the armature, there will always be a current of constant potential at the same brush-holder.

In Fig. 2 I have shown an end view, and in Fig. 3 a side view, of my method of mounting the bushing on the axle of the car to eliminate all vibration, $d$ being the bushing, on which the generator is mounted, and $a$ the axle, which does not directly touch the bushing, while 10 is one of the eight heavy round springs, which are firmly fastened to the bushing $d$ at one end and the split circular collor 11 at the other, and in order to force this split circular collar to a tight fit on the axle $a$ I screw on the outer ring 12, which mounts on a taper thread, tightening the split collar. There is a sufficient space between $d$ and $a$ to prevent it touching. All of the vibration of the axle $a$ is transmitted through the spring 10, where it is taken up, and little or none reaches the bushing $d$. I do not necessarily confine myself to this form of spring, the idea being to interpose some sort of yielding material between the bushing of the generator and the axle of the trunk.

In the drawing Fig. 4 I have shown a diagram of the entire system. 72 represents my direct-connected generator with four wires leading from it, wires 1 and 2 being the main circuit, while wires 3 and 4 connect a variable resistance 13 into the shunt-circuit, which is operated by a specially-constructed regulator. In shunt across the leads 1 and 2 are placed motors 14 and 15, which are thrown into the circuit when the solenoid-switch 16 completes the circuit across 17 and 18 by the insertion of the plugs 19 and 20. These motors are connected to run in opposite directions, and motor 15 is wound to normally revolve faster than motor 14. On the shaft of the motor 15 I place a regulator or governor of any known type, so that the motor speed will always be the same—say eight hundred revolutions per minute. Before the voltage drops low enough to reduce this speed the solenoid-switch 16 will throw both motors out of circuit. Motor 14 revolves gear 21, while motor 15 revolves its mate 22, but in the opposite direction. Between these two gears are placed pinions 23 and 24, mounted on the same axle, which is fastened to the bushing 25, thus forming a differential gear, the pinions 23 and 24 following the direction of rotation of the faster-revolving gear. If there should be an excess of voltage on the circuit 1 and 2, motor 14 will run faster than motor 15, which runs at a fixed speed. Therefore gear 21 would revolve faster than gear 22, and the spur-gears would travel in the direction of the faster. On the outside of these spur-gears is fastened the outer planetary worm 26, which in turn meshes into the gear 27. When 26 follows the two spur-gears in one direction or the other, it turns the wheel 27, which moves contact-arm 28 to the right or left over the contact-points of the resistance 13, thereby including more or less of it in the shunt-circuit. If arm 28 stands horizontal to the right, all resistance is introduced into the circuit. If it stands horizontal to the left and makes contact on the button 29, the resistance is short-circuited. By this means of resistance variation the line voltage can be held at a predetermined constant value. In the solenoid-switch the plunger 31 is partly covered by solenoid. The spring 52 reacts on the pull exerted by the magnetizing action of the solenoid on the plunger and forces it back to its normal position when the solenoid-current is below a given strength. The circuit in wire 2 is broken at 32 and 33 when the arm 34 is out and made when it is in. When the arm 35 is in, circuit is made around the resistance 36, and when it is out the resistance is thrown in the lamp-circuit in order to keep the voltage on the circuit the same whether the lamps are being fed from the generator or the batteries. 37 represents the batteries placed in the same circuit as the translating-circuit 38. They may both be fed at the same time from the generator.

The operation of the entire device, as shown in diagram Fig. 4, will be as follows: When running below twelve miles per hour, the circuit from the generator is interrupted at terminals 32 33, the pressure being too low to actuate switch 16. During this interval the lamps are fed by the battery, leaving at terminal 39, wire 1, through the closed arm of switch 35, to the lamps and over wire 2 to battery-terminal 40, resistance 36 being short-circuited. When, however, the current is of sufficient strength to operate the switch, contact is closed at terminals 32, 33, 17, and 18 and opened at 41 and 42. By this operation the resistance 36 is inserted into the lamp-circuit and generator 72 connected to the same and to the battery-circuit. The excess pressure required for charging the battery over the normal pressure used by the lamps is consumed by resistance 36. The current will then flow through wire 1, through the resistance 36, to one side of the lamp-circuit, and return by wire 2, through the arm 34, to the other side of the generator. This current, however, without regulation would mount in voltage as the speed of the train increased until the lamps would burn out.

The regulator operates as follows: The shunt-current would pass through the constant-speed motor 15, entering by wire 5 and leaving by wire 6, to the other side of the circuit. In the case of the varying-speed motor current would enter by wire 8 and leave by wire 7. As the line voltage increased, due to the increase in speed of the generator, the motor 14 would run faster than the predetermined speed of the motor 15, which would be set to maintain a voltage of one hundred and ten—that is, the same speed as motor 14 would run when receiving one hundred and ten volts. The arm 28 would be shifted through the movement of the differential gear and the outer planetary worm and resistance would be interposed in the field-circuit of the generator, weakening it until the voltage at the terminal would permit the motor 14 to run at the set speed of the motor 15. This device is only intended to be operative when the speed of the train exceeds twelve miles per hour.

At that speed the maximum voltage is reached and will be maintained from then on. It may be conveniently mentioned here that the energy may be used for other translating devices, such as a fan 100, as shown, or for other purposes, such as the operation of devices for refrigeration and heating. Further, one mode of circuit connection and one specific form of generator has been shown; but others can be used to accomplish the same purpose, as is well understood by those skilled in the art. I therefore do not desire to be understood as limiting myself to the exact construction shown and described herein or any further than is pointed out in the following claims.

I claim—

1. In an axle generating and translating system, the combination of a plurality of armatures mounted on a bushing adapted to be secured to the axle of the car-truck, a commutator for each two armatures, a single field-frame for said two armatures journaled on said bushing, a self-adjusting current-collecting device applied to said commutator, means—such as stops—to control the working position of said current-collecting device, and a translating-circuit for consuming the energy furnished by said armature, substantially as described.

2. In a distribution system, the combination of a generator, a regulator consisting of two differentially-acting motors, a gear system and a variable resistance operated by said gear system, and an automatic switch for said motors to include them in or exclude them from the circuit at predetermined voltages, substantially as described.

3. In an electric distribution system, the combination of a generator, two differentially-acting motors energized by said generator, an automatic switch for controlling the circuit connections of said motors and a translating-circuit consisting of a storage battery, and consumption devices connected thereto, substantially as described.

4. In an electric distribution system, the combination of a generator, two differentially-acting motors energized by said generator, an automatic switch for controlling the circuit connections of said motors and a translating-circuit consisting of a storage battery, consumption devices connected thereto, and an automatic switch for simultaneously controlling the circuit connections of said motors and said translating-circuit, substantially as described.

5. In a variable-speed generating system, the combination of an electric generator, two differentially-acting motors, a differential gear and planetary worm actuated by said motors for controlling the generator-pressure, a storage battery, translating devices in circuit with said battery, a solenoid-switch connected across the dynamo-terminals adapted to actuate at a predetermined voltage for simultaneously including into the generator-circuit said motors and battery-circuit, and means for maintaining a practically constant voltage for said translating devices, substantially as described.

6. In an axle generating and translating system of distribution, the combination with a generator of a self-adjusting brush-holder, a terminal pressure-regulator consisting of two differentially-acting motors deriving power from said generator and controlling suitable means for varying the field-magnet strength of said generator, translating devices, and a storage battery, substantially as described.

7. In a system of distribution, the combination of a generator, translating devices, a regulator interposed between said generator and translating devices, a second regulator for varying the field strength of said generator consisting of a constant-speed and a variable-speed motor, a differential gear jointly operated by both motors and operating means such as an arm for including or excluding more or less resistance in the generator field-circuits, substantially as described.

8. In a system of distribution and in combination with a primary and secondary generator, translating devices, a pressure-regulator for said devices and another for said generator, a single automatic controlling-switch adapted to simultaneously introduce the two regulators into their respective circuits and to connect said primary generator to said translating devices, substantially as described.

9. In a direct-connected generator, the combination with the axle of a car-truck, of collars solidly mounted on said axle, a generator-armature provided with a hollow spindle or bushing and yielding springs firmly supporting said armature and establishing a practically fixed relation between said armature and said axle connecting said bushing with said collars.

In testimony whereof I have subscribed my name in the presence of two subscribing witnesses.

DAVID CARL HENRY.

Witnesses:
C. F. ELLIOTT,
W. H. FRASER.